United States Patent [19]
Kodama et al.

[11] Patent Number: 5,231,511
[45] Date of Patent: Jul. 27, 1993

[54] STILL IMAGE RECORDING/PLAYBACK APPARATUS WITH PLAYER ELECTRONICS CONNECTABLE TO AN ELECTRONIC STILL CAMERA TO INITIATE PREDETERMINED OPERATING MODES

[75] Inventors: Yasumasa Kodama, Kanagawa; Kazuo Watanabe, Chiba; Takashi Fukushima, Tokyo; Masaki Kawano, Tokyo; Shinji Katsuki, Tokyo; Takashi Hishinuma, Kanagawa, all of Japan

[73] Assignee: Sony Corporation, Tokyo, Japan

[21] Appl. No.: 407,147

[22] Filed: Sep. 14, 1989

[30] Foreign Application Priority Data

Sep. 19, 1988 [JP] Japan ................ 63-234264
Sep. 22, 1988 [JP] Japan ................ 63-236530

[51] Int. Cl.$^5$ ........................... H04N 5/76
[52] U.S. Cl. .................. 358/335; 358/906; 358/909
[58] Field of Search ........... 358/906, 909, 229, 335, 358/209; 360/79, 33.1, 35.1

[56] References Cited

U.S. PATENT DOCUMENTS

| | | | |
|---|---|---|---|
| 4,470,077 | 9/1984 | Komine | 358/906 |
| 4,507,689 | 3/1985 | Kozuki et al. | 358/906 |
| 4,713,702 | 12/1987 | Ishihara et al. | 360/79 |
| 4,746,990 | 5/1988 | Katoh et al. | 358/906 |
| 4,782,355 | 11/1988 | Sakai et al. | 358/909 |
| 4,782,393 | 11/1988 | Kawamura | 358/209 |
| 4,797,737 | 1/1989 | Yazawa | 360/74.1 |
| 5,016,124 | 5/1991 | Fukushima et al. | 358/906 |

Primary Examiner—Tommy Chin
Assistant Examiner—Huy Nguyen
Attorney, Agent, or Firm—William S. Frommer; Alvin Sinderbrand

[57] ABSTRACT

Still image recording/playback apparatus comprising an electronic still camera having operating components including an image sensor for sensing an image and producing image signals representative thereof, a recorder for recording image signals derived from the image sensor, playback circuitry for playing back the recorded image signals and a camera controller for controlling at least the recorder and playback circuitry. An electronic player is selectively connectable to the camera and has a signal processor for processing the image signals played back by the playback circuitry to produce viewable picture signals, and a player controller for selectively controlling the operation of the electronic player. When a connection between the camera and player is detected, a predetermined operating mode for both the camera and player is established.

26 Claims, 7 Drawing Sheets

STILL IMAGE RECORDING/PLAYBACK APPARATUS WITH PLAYER ELECTRONICS CONNECTABLE TO AN ELECTRONIC STILL CAMERA TO INITIATE PREDETERMINED OPERATING MODES

BACKGROUND OF THE INVENTION

1. Field Of The Invention

This invention relates to electronic image recording/playback apparatus and, more particularly, to the selection of a predetermined operating mode when an electronic still camera is connected to an electronic player.

2. Description Of The Prior Art

So-called electronic still cameras have been introduced in which video signals are generated in response to a sensed image and recorded on a magnetic medium, such as a miniaturized floppy disk. Video picture signals, produced when the recorded video signals are played back, may be displayed on a monitor, such as a conventional television receiver, or may be "printed" to form a "hard copy" image corresponding thereto.

Although separate stand-alone players are known for playing back previously recorded video signals from a floppy disk, it is advantageous to use the operating components of the electronic still camera to reproduce those video signals. Often, the reproduced video signals are not in a format compatible with most conventional monitors or television receivers. For example, the reproduced video signals may not be in the NTSC format. Accordingly, further signal processing of the reproduced video signals often is desired; and an electronic player typically is electrically connected to the electronic camera so as to process the reproduced video signals and, thus, produce picture signals which may be displayed on a monitor or television receiver. The electronic player normally is provided with an output terminal adapted to be connected to the input of such a monitor or television display. When a user actuates a playback button, or switch, disposed on the electronic player, a playback operation is carried out, whereupon the video signals are reproduced from the magnetic medium, processed and supplied to the monitor/display.

A typical electronic player is a separate device normally not connected to the electronic camera unless and until a playback operation is desired. To facilitate portability and use "in-the-field", the player is provided with a battery which functions as its power source. The battery may be of the rechargeable type or, alternatively, a non-rechargeable "primary battery" may be used.

The power source for the camera likewise is a battery; and it too may be a rechargeable battery or a primary battery. When a rechargeable battery is used as the camera power source, a charging unit generally dedicated for use only with the camera must be provided; and the camera normally cannot be used in an operating mode (e.g. recording or playback) while its battery is being charged.

As mentioned above, the electronic player normally is not coupled to the camera unless and until an image playback operation is desired. However, a playback operation typically is not initiated until the user actuates the playback button, even though the camera, player and monitor may be properly connected. In some systems, the playback button is concealed to avoid inadvertent operation of the player. In other systems, the playback button may be included in an array of operating controls, and the user may erroneously actuate the wrong control. It is desirable to simplify a playback operation.

Although the camera and player both may be provided with batteries as their respective power sources, these batteries generally are used independently of each other even when the camera and player are connected. For a playback operation, the camera is powered by the camera battery and the player is powered by the player battery. Thus, power is drawn from both batteries and both are subject to rapid depletion. If a rather lengthy playback operation is carried out, or if several brief playback operations are performed, the camera battery voltage may be significantly reduced. Consequently, the camera battery may need to be recharged before a signal recording operation next can be achieved. This means that the user of the electronic camera may miss a desirable photographic opportunity.

In many conventional electronic cameras using rechargeable batteries as a power source, battery recharging requires removal of the battery from the camera and loading of same into a charging unit. Often, battery removal and loading is complicated. Further complications arise when both the camera and player batteries are to be recharged. Moreover, even the relatively simple task of removing and loading one or both batteries is time consuming.

OBJECTS AND SUMMARY OF THE INVENTION

Therefore, it is an object of the present invention to provide improved apparatus which avoids all of the foregoing drawbacks and disadvantages.

Another object of this invention is to provide image recording/playback apparatus which automatically is disposed in a playback mode when a player is coupled to an electronic still camera.

A further object of this invention is to provide battery powered image recording/playback apparatus in which power is supplied to playback apparatus included in an electronic still camera from a power source located in a player when the player and camera are connected.

An additional object of this invention is to provide battery powered still image recording/playback apparatus in which the battery of an electronic still camera is charged preferentially by a charging unit included in a player when the player and camera are connected.

Another object of this invention is to minimize the power drain on the battery of an electronic still camera when the camera is connected to a player for playing back previously recorded still image signals.

A further object of this invention is to preferentially charge the battery of an electronic still camera when the camera is connected to a player having a charging unit, such that the camera battery first is charged and, thereafter, the player battery is charged.

Another object of this invention is to permit the battery included in an electronic camera to be charged when the camera is connected to a player having a charging unit while, at the same time, power is supplied from the player to the camera to permit the camera to carry out a playback operation even while its battery is charging.

Various other objects, advantages and features of the present invention will become readily apparent from the ensuing detailed description and the novel features will be particularly pointed out in the appended claims.

In accordance with this invention, still image recording/playback apparatus is comprised of an electronic still camera having operating components including an image sensor for sensing an image and producing image signals representative thereof, a recorder for recording image signals derived from the image sensor, and playback circuitry for playing back the recorded image signals. An electronic player is selectively connectable to the camera and has a signal processor for processing the image signals played back by the playback circuitry to produce viewable picture signals. Both the camera and player have controllers for selectively controlling their respective operations. When a connection between the camera and player is detected, a predetermined operating mode is established.

In accordance with one aspect of this invention, the predetermined operating mode is a playback operation and a connection detect signal is supplied to the camera controller when the camera and player are connected. The camera controller responds to this signal to initiate operation of the playback circuitry. Concurrently, the recorder is inhibited from recording signals. As a feature of this aspect, the camera controller supplies a signal to the player controller via the camera/player connection, whereupon the player controller enables the operation of the signal processor in the player.

In accordance with another aspect of this invention, the predetermined operating mode is a power supplying operation such that power produced by a power source provided in the player is substituted for power produced by a power source provided in the camera. That is, when the camera and player are connected, the player power source is used to supply power to the camera, whereby a playback operation may be carried out. As a feature of this aspect, the camera includes a power switch which normally couples the power produced by the camera power source to the camera operating components. This switch is responsive to the detected connection between the camera and player for coupling to the camera operating components the power supplied from the player power source. In one embodiment, both the camera and player power sources are batteries. In another embodiment, the player power source includes a DC converter for converting an AC supply voltage to DC power. In this latter embodiment, the player includes a selector switch which normally couples the player battery to the camera to power the camera operating components, this switch being changed over to couple the DC power produced by the DC converter to the camera when the DC converter is coupled to AC mains.

As yet another aspect of this invention, the predetermined operating mode is a battery charging operation; and both the camera and player include rechargeable batteries, with the camera battery being charged by a battery charger included in the player when the camera and player are connected. As a feature of this aspect, the camera battery is charged preferentially by the charger before the player battery is charged.

As another feature of this aspect, the player includes a charging switch for selectively coupling the player battery to the charger, this charging switch being changed over to couple the camera battery to the charger when the camera and player are connected.

As a still further feature of this aspect, the charger includes a DC converter for converting AC supply voltage to DC power, this converted DC power being coupled to the camera by way of the camera/player connection. The camera includes a power selector for normally coupling the camera battery to the camera operating components and for coupling the converted DC power from the player to the operating components when the camera and player are connected.

As yet another feature of this aspect, while the camera battery is charged by the charger included in the player, the converted DC power supplied to the camera is coupled to the camera operating components, such that a playback operation may be carried out concurrently with a camera battery charging operation.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF A PREFERRED EMBODIMENT

Figure 1:
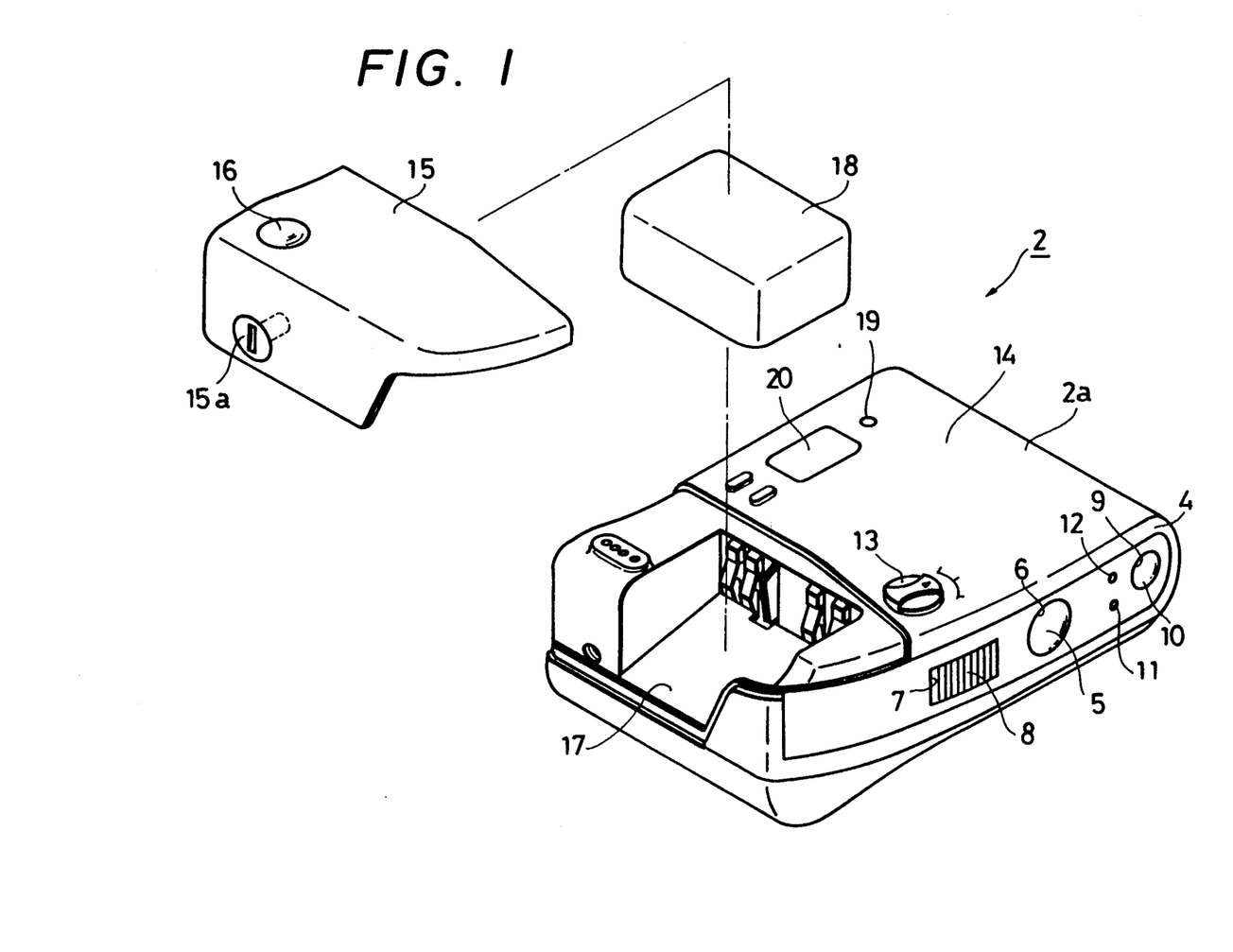
FIGS. 1 and 2 are front and rear perspective views of a preferred electronic still camera.

Referring now to the drawings, wherein like reference numerals are used throughout, FIG. 1 is a front perspective view of one embodiment of an electronic still camera 2 adapted to record image signals on a magnetic medium. Camera 2 is provided with an outer casing 2a whose front portion 4 includes an aperture 6 through which a photographic lens 5 may be exposed to an external image or scene to be photographed. Another aperture 7 adjacent to aperture 6 in front portion 4 permits an electronic flash unit 8 to irradiate the image to be photographed. Yet another aperture 9 exposes an objective lens 10 to the image being photographed, this objective lens being used by the user as a view finder.

A photosensor 11 is provided on front portion 4 of housing 2a to sense the quantity of light emitted by electronic flash 8. When a proper amount of light is sensed, the flash unit is turned off. In addition, a light emitting diode (LED) 12 is disposed on front portion 4 and is used as a timer indicator. As is found in conventional photography, LED 12 blinks during a timing operation to apprise a user of the time duration remaining until an image is photographed. Those of ordinary skill in the art will recognize that LED 12 is part of a self-timer.

A mode switch 13 is located on upper portion 14 of casing 2a and, in one embodiment, is comprised of a rotary switch having three contacts, or detents. Thus, any one of three modes may be selected by the user, such as a power off mode, a single frame photographing mode and a continuous, or successive frame photographing mode. In the power off mode, electrical power is not supplied to the operating components of camera 2, thereby placing the camera in an OFF state. In the single photographing mode, only one image or frame, is photographed in response to each depression of a shutter release button 16. In the continuous photographing mode, successive images are recorded while the shutter release button is depressed. These functions are analogous to those performed in conventional photographic cameras.

Camera 2 also includes a cover 15 detachably mounted on casing 2a by means of a fastening screw 15a. Shutter release button 16 is disposed on cover 15 and includes first and second switches which are actuated sequentially when the shutter release button is depressed. When this button is partially depressed, the first switch is operated to supply electrical power to an image sensor and to recording elements, to be described. When button 16 is depressed further, the second switch is operated to carry out an image recording operation. Thus, the purpose of the first switch is to establish a stand-by condition immediately before the actual image recording operation is performed. This stand-by condition conserves power, which is particularly helpful when the power source is a battery.

The body of camera 2 is provided with a recess 17 which is covered by cover 15. The recess is adapted to receive a rechargeable battery pack 18 or, alternatively, one or more primary batteries for supplying electrical power to the operating components included within camera 2.

Top portion 14 of casing 2a also is provided with a self-timer button 19 which cooperates with shutter release button 16 to carry out a time delayed imaging operation. For example, if self-timer button 19 is depressed and then shutter release button 16 also is depressed, a timed picture taking operation is initiated. LED 12 blinks during a pre-established time-out period at the completion of which an image is recorded.

Top portion 14 of casing 2a also is provided with a display 20 for displaying various data to the user of camera 2. This display may be similar to many LCD displays commonly found in conventional photographic cameras recently introduced.

Figure 2:
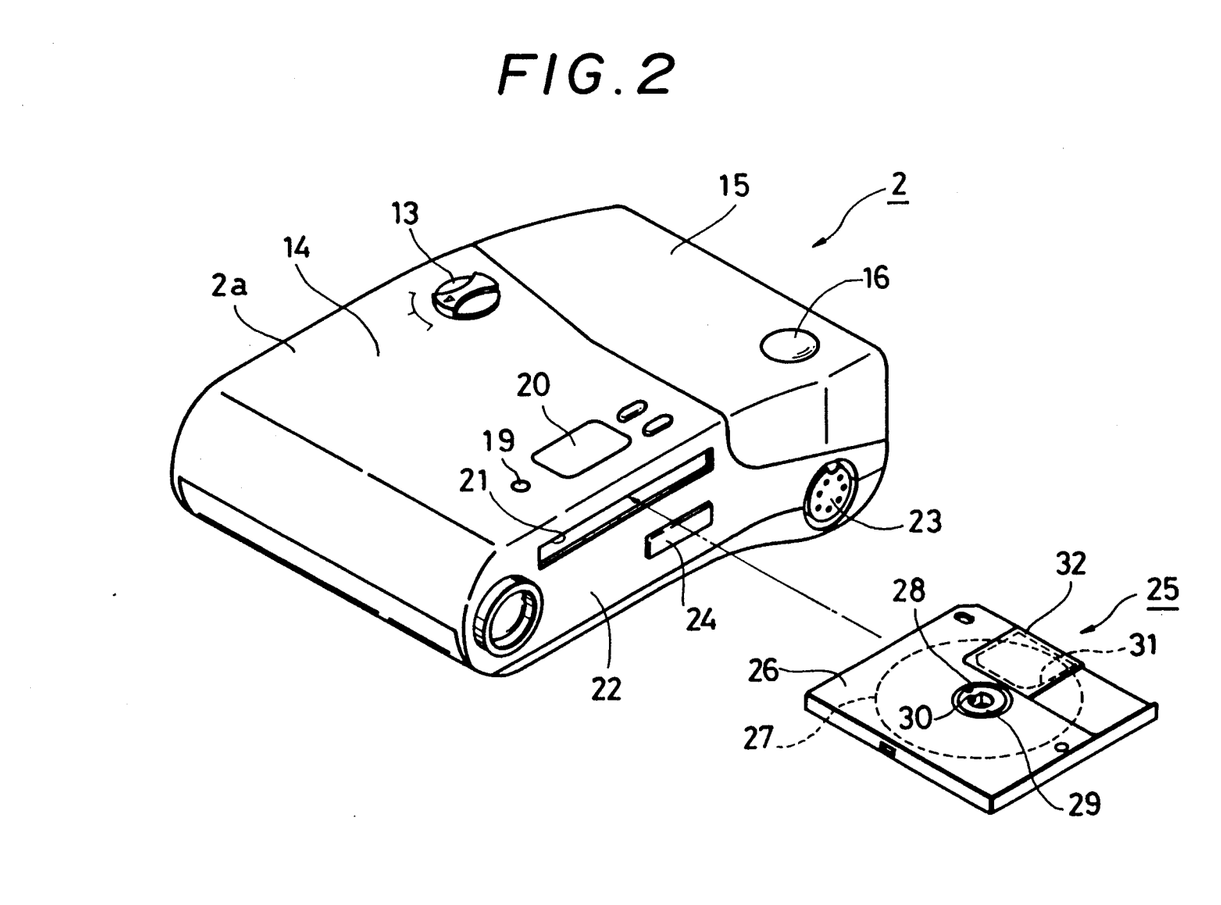

Turning to FIG. 2, a rear portion 22 of casing 2a is provided with an insertion port 21, formed as a slit and adapted to receive a magnetic recording medium upon which image signals are recorded. Preferably, the magnetic recording medium is embodied as a magnetic disk housed within a suitable jacket, and referred to as a magnetic disk cassette 25. Jacket, or case 26 of cassette 25 is formed of a synthetic resin and, as illustrated, exhibits a square, box-like shape. A magnetic disk 27 is rotatably supported within case 26 by means of a center core 29 fixed in the center of disk 27 which mates with aperture 28 of case 26. Center core 29 may be accessed by a spindle (not shown) within camera 2 which passes through aperture 28. An engaging hole 30 is provided in center core 29 and cooperates with the rotatable drive mechanism and spindle of the camera.

Case 26 includes a pair of apertures, only one of which 31 is illustrated, through which record/playback heads are inserted into magnetic contact with disk 27. Aperture 31 is formed in the vicinity of a side edge of case 26 and is covered by a slidable shutter 32 provided on the case. Shutter 32 opens to permit a record/playback head to pass through aperture 31 into magnetic contact with disk 27 and, after the head is withdrawn, the shutter closes to protect the magnetic medium. Camera 2 includes elements which cooperate with shutter 32 to slide it to its open and closed positions.

It is appreciated that when cassette 25 is manually inserted through insertion port 21, shutter 32 slides to its open position and the disk drive spindle included in camera 2 engages hole 30 to rotate disk 27. When shutter 32 is in its open position, the aforementioned record/playback head contacts disk 27.

An eject button 24 is provided on rear portion 22 of casing 2a and is adapted, when operated, to eject cassette 25 from camera 2 through port 21.

A connector 23, such as a multi-pin socket, also is provided on rear portion 22 of the casing. Connector 23 is adapted to receive a connector cable for electrically connecting camera 2 to an electronic player 3 shown in FIG. 3.

Figure 3:
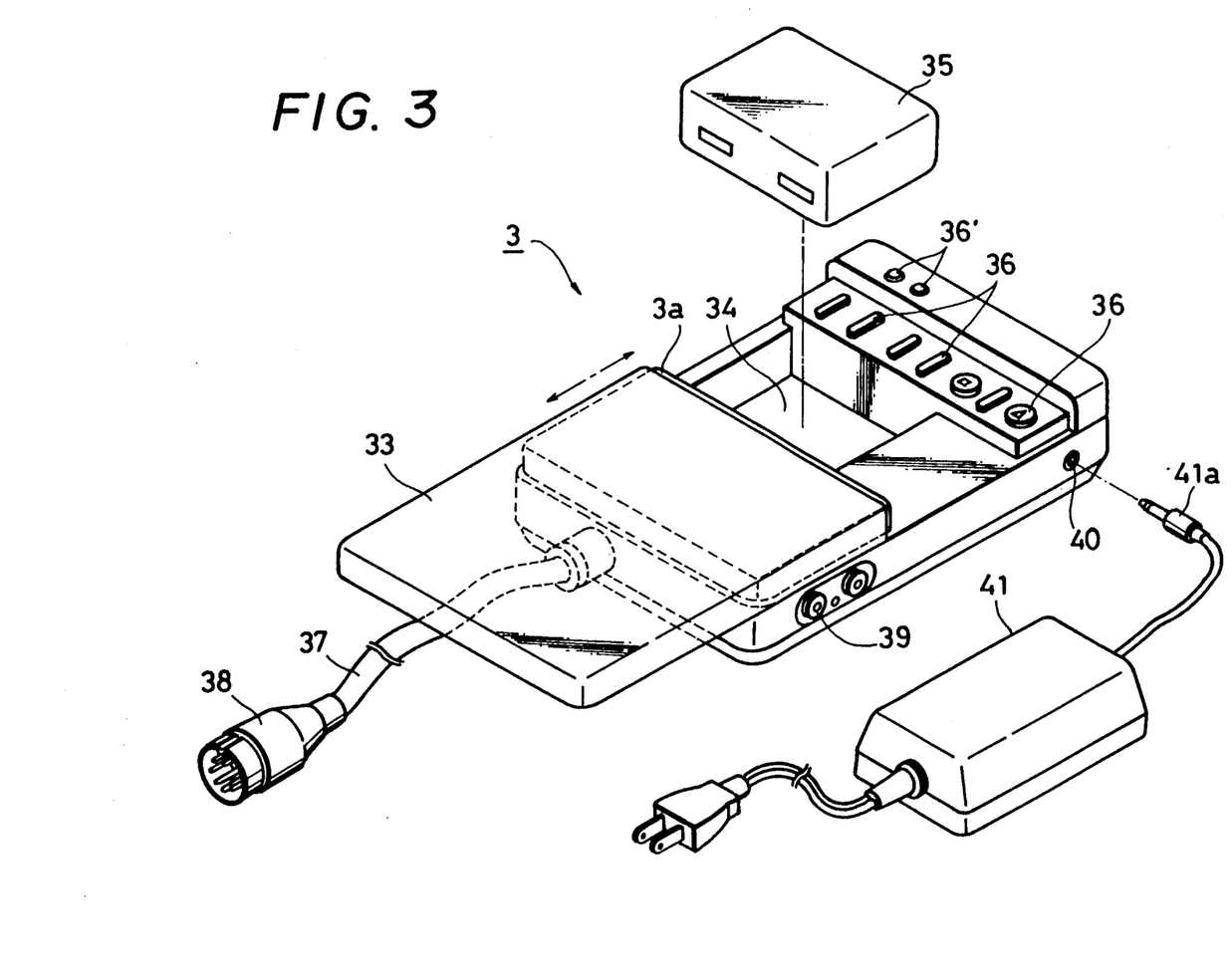
FIG. 3 is a perspective view of an electronic player which may be used with the camera of FIGS. 1 and 2.

As illustrated, player 3 is of a generally rectangular shape having an outer casing 3a which houses signal processing circuitry, to be described. Casing 3a includes a recess 34 adapted to receive a rechargeable battery pack 35 or, alternatively, one or more primary batteries for supplying electrical power to the signal processing circuitry. A slide cover 33 slidably engages a groove formed on outer casing 3a and is adapted to cover recess 34 and battery 35.

A ledge is provided adjacent recess 34 on which are disposed various selector buttons 36, such as frame feed playback, stop, clear, and other such selector buttons. As shown, buttons 36 are concealed when cover 33 slides to its closed position.

Outer casing 3a also is provided with a pair of LED's 36' which are used to indicate whether rechargeable battery 18 included in camera 2 or rechargeable battery 35 included in player 3 is in the process of being recharged. As will be described below, player 3 includes a charging unit which, when supplied with external energy, is used to charge either the battery included in the player or, when the player is connected to the camera, the battery included in the camera.

A connecting cable 37 extends from outer casing 3a and terminates in a plug 38 adapted to be inserted into socket 23 of camera 2. Electrical connections between the camera and player are used for various purposes, described below.

Player 3 also includes an output terminal 39 disposed on a side wall of outer casing 3a for supplying to an external monitor or television display picture signals which are produced in response to image signals played back from cassette 25 in camera 2. For example, the signal processing circuitry in player 3 may supply NTSC signals to the monitor coupled to terminal 39 so that a still image may be reproduced and displayed thereon.

Player 3 also includes a DC input terminal 40 adapted to receive a plug 41a of an AC adaptor 41. When the adaptor is connected to AC mains, it produces and supplies DC power to player 3 by means of plug 41a and DC input terminal 40.

Figure 4:
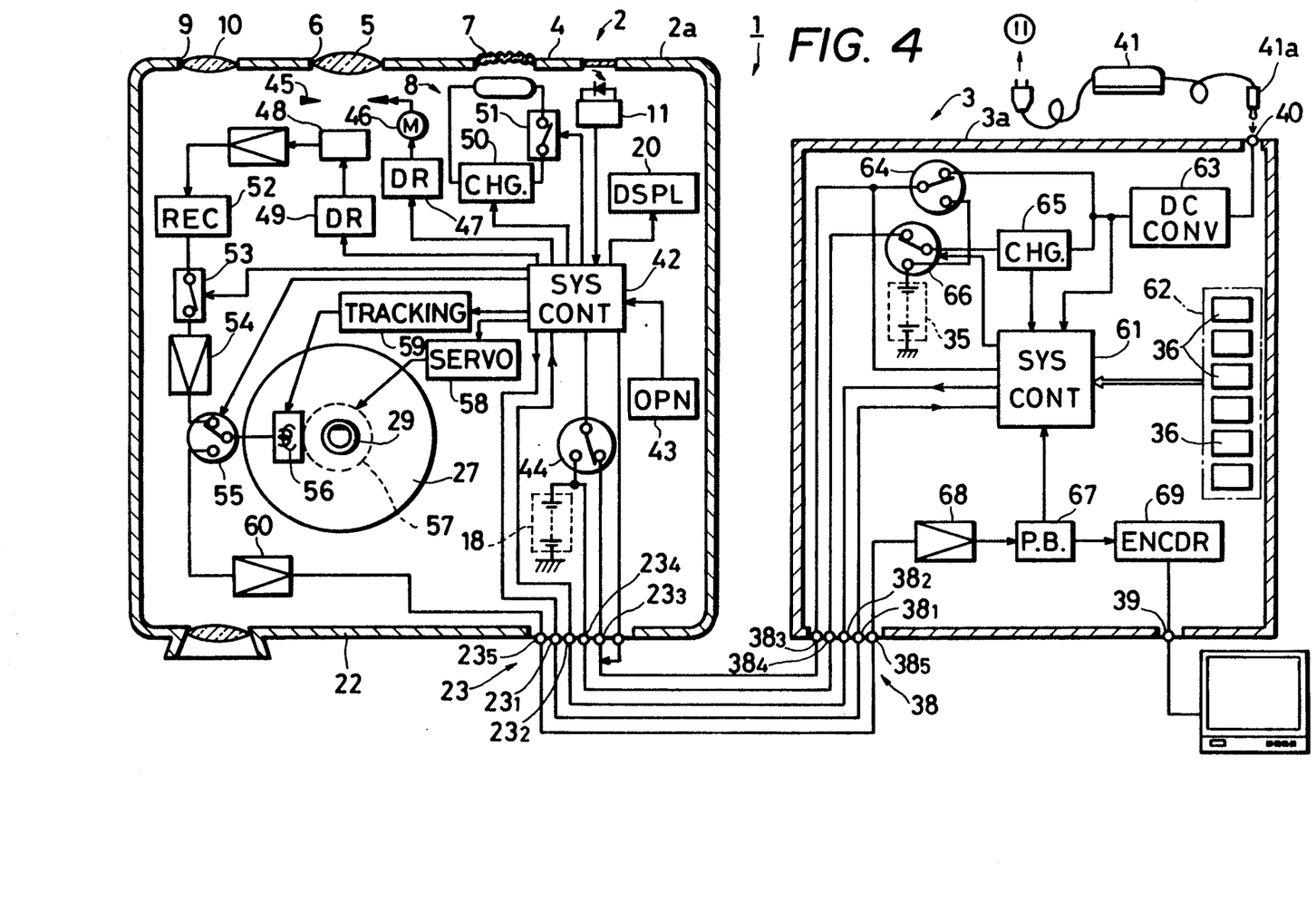
FIG. 4 is a block diagram of electronic circuitry included in an interconnected camera and player.

Turning now to FIG. 4, there is illustrated a block diagram of camera 2 connected to player 3 by means of the connection established by cable 37, plug 38 and socket 23. FIG. 4 schematically illustrates the electrical connections between plug 38 and socket 23. It is appreciated that cable 37 is comprised of individual conductors; and each pin connection of socket 23 is coupled to a respective connection of plug 38 to interconnect circuit elements of camera 2 with circuit elements of player 3.

Camera 2 is comprised of those elements shown and described above in conjunction with FIGS. 1 and 2 and, additionally, includes operating components, such as an image sensor 48, recording circuitry 52, playback circuitry, various control circuits and a system controller 42. Sensor 48 is adapted to receive an optical image projected thereto through lens 5 and iris 45. The iris is driven by a motor 46 which, in turn, is controlled by a motor drive circuit 47. Sensor 48 preferably is formed as a solid state sensing device, such as an MOS sensor, and is coupled to a drive circuit 49 which operates as an electronic shutter for the sensor.

Sensor 48 is responsive to an image projected thereto to produce corresponding image signals that are supplied by an amplifier to recording circuitry 52. Recording circuitry 52 processes the image signals supplied thereto; and these processed image signals are coupled to a recording amplifier 54 by a switch or gate 53, and then supplied to a read/write head 56 by a record/-playback switch 55. The read/write head corresponds to the aforementioned record/playback head. For convenience and simplification, gate 53 and switch 55 are illustrated schematically as simple electromechanical switches. As will be described, both gate 53 and switch 55 are controlled by system controller 42.

During a recording operation, read/write head 56 functions to record the processed image signals on magnetic disk 27 which is rotatably driven by a spindle motor 57. Disk 27 preferably rotates at a substantially constant speed, and motor 57 is controlled by a servo circuit 58. Additionally, head 56 is driven in a generally radial direction across disk 27 by a suitable motor, such as a stepping motor, controlled by a tracking servo circuit 59. Thus, as disk 27 rotates, head 56 records successive tracks thereon.

The playback circuitry provided in camera 2 includes a playback amplifier 60 which is coupled to read/write head 56 by aforementioned switch 55. During a playback operation, previously recorded image signals are played back by head 56, amplified by amplifier 60 and supplied by the amplifier to an output terminal $23_5$ of connector socket 23.

The camera also includes an electronic flash charger 50 which is coupled to a suitable flash tube (or equivalent) by way of a flash synchro contact 51. Flash charger 50 is adapted to be controlled by system controller 42 which also functions to control driving circuits 47 and 49 as well as display 20. Flash photosensor 11 supplies to the system controller information representing the amount of flash illumination that has been generated by the flash unit; and this information is used by system controller 42 to open flash synchro contact 51 to terminate the flash discharge.

As illustrated, system controller 42 also is coupled to an operation unit 43 which, generally, includes the aforedescribed shutter release button 16 and self-timer button 19. Operation unit 43 supplies the system controller with an indication of each button that is operated.

Battery 18 is schematically illustrated as being coupled to system controller 42 by way of a power selector switch 44. Preferably, the operation of switch 44 is controlled by system controller 42; but it is contemplated that this switch may alternatively be operated when plug 38 is inserted into socket 23. When player 3 is not connected to camera 2, switch 44 couples battery 18 to the system controller; and as will be described below, the battery also is coupled to various ones of the circuits included in the illustrated operating components of camera 2 so as to supply electric power thereto. However, when player 3 is connected to camera 2, switch 44 couples electric power supplied from the player to system controller 42 and to the operating components of the camera. It will be appreciated that the energy level of battery 18 thus is not depleted when the player and camera are connected.

System controller 42 is coupled to a predetermined terminal included in socket 23 to detect when plug 38 is connected thereto. Thus, the system controller detects a connection between camera 2 and player 3. As schematically illustrated, some of the conductors of cable 37 are coupled between system controller 42 and a similar system controller 61 included in player 3. For example, terminals $23_1$ and $23_2$ are connected by respective conductors to terminals $38_1$ and $38_2$ to permit communication between the respective system controllers for a purpose described below.

Although not shown, an auxiliary source of power may be coupled to system controller 42 to prevent any loss of information due to power drop out when switch 44 is changed over from, for example, battery 18 to the external power source provided by player 3. Such auxiliary power supply may be a lithium battery or other conventional back-up power source.

Player 3 is comprised of signal processing circuitry adapted to be coupled by way of cable 37, plug 38 and socket 23 to playback amplifier 60 of camera 2. The player also includes a battery 35, as described previously, as well as an AC/DC converter 63 and a battery charger 65. As shown, system controller 61 of player 3 is coupled to an encoding circuit 62, or the like, adapted to supply the system controller with signals representing the particular one of push-buttons 36 that is operated.

AC/DC converter 63 included in player 3 is connected by DC input terminal 40 to plug 41a and then to AC adaptor 41, as described previously in connection with FIG. 3. The DC output of converter 63 is coupled to system controller 61 and also to battery charger 65 and to a selector switch 64. The output of selector switch 64 is coupled to terminal $38_3$ and, by way of the illustrated conductor, to terminal $23_3$ of camera 2, this latter terminal being coupled to system controller 42 by way of switch 44.

Selector switch 64 includes an additional input coupled to battery 35. Thus, depending upon the state, or position, of switch 64, either battery 35 or converter 63 is utilized to supply power to camera 2. In the preferred embodiment, system controller 61 determines the state, or switching position, of selector switch 64. In an alternative embodiment, the state or position of switch 64 is determined by the presence or absence of a connection between DC input terminal 40 and plug 41a. That is, when plug 41a is inserted into terminal 40, switch 64 couples the output of converter 63 to terminal $23_3$ of camera 2. If plug 41a is not connected to DC input terminal 40, switch 64 couples battery 35 to the camera.

In one embodiment, the output of converter 63 is coupled to system controller 61, as by way of a voltage detector (not shown). It is appreciated that the converter produces an output DC voltage only when it is connected to adaptor 41. Thus, system controller 61 may determine the state, or position, of switch 64 as a function of the voltage detected at the output of converter 63.

Battery charger 65 is coupled to the output of converter 63 and is adapted to produce a charging voltage when the converter is supplied with operating voltage from adaptor 41. The output of battery charger 65 is selectively coupled by way of a charging switch 66 to battery 35 or to battery 18. In one embodiment, the state, or position, of charging switch 66 is determined by system controller 61 as a function of whether camera 2 is connected to player 3. In the preferred embodiment, when system controller 42 of camera 2 detects the connection between the camera and player, a suitable indication thereof is supplied to system controller 61 which then senses if converter 63 produces an output DC voltage. If so, system controller 61 commands charging switch 66 to connect battery charger 65 to terminal $38_4$ which, in turn, is connected to battery 18 by way of terminal $23_4$. If battery 18 is fully charged, system controller 42 supplies a suitable indication thereof to system controller 61, whereupon system controller 61 changes over the state, or position, of charging switch 66 so as to connect the output of battery charger 65 to battery 35. As will be explained below, system controllers 42 and 61 thus operate to preferentially charge camera battery 18 and, thereafter, to charge player battery 35 when the camera and player are interconnected and, moreover, when converter 63 is supplied with a voltage from adapter 41.

The signal processing circuitry included in player 3 includes a playback amplifier 68, a playback circuit 67 and a signal encoder 69. Playback amplifier 68 is coupled to a terminal $38_5$ which, in turn, is coupled to terminal $23_5$ of camera 2 to supply the played back image signals to the player. The amplified image signals are demodulated by playback circuit 67 and supplied to signal encoder 69. In addition, the synchronizing signals included in the played back image signals are supplied to system controller 61 to synchronize its operation. Encoder 69 produces a viewable picture signal, such as an NTSC color television signal, from the amplified, played back image signals. Encoder 69 is coupled to output terminal 39 to which a monitor may be connected so as to display the still picture reproduced from disk 27.

Although not shown, it will be appreciated that suitable operating power is supplied to the processing circuitry included in player 3 either from battery 35 or from converter 63, as determined by system controller 61.

Selected operation arising out of the connection of camera 2 and player 3 now will be described in conjunction with FIGS. 5, 6A and 6B. As will be explained, when the camera and player are connected, camera 2 is disposed automatically in its image signal playback mode, DC power is supplied to the camera from player 3, and camera battery 18 is charged by the battery charger included in player 3.

Figure 5:
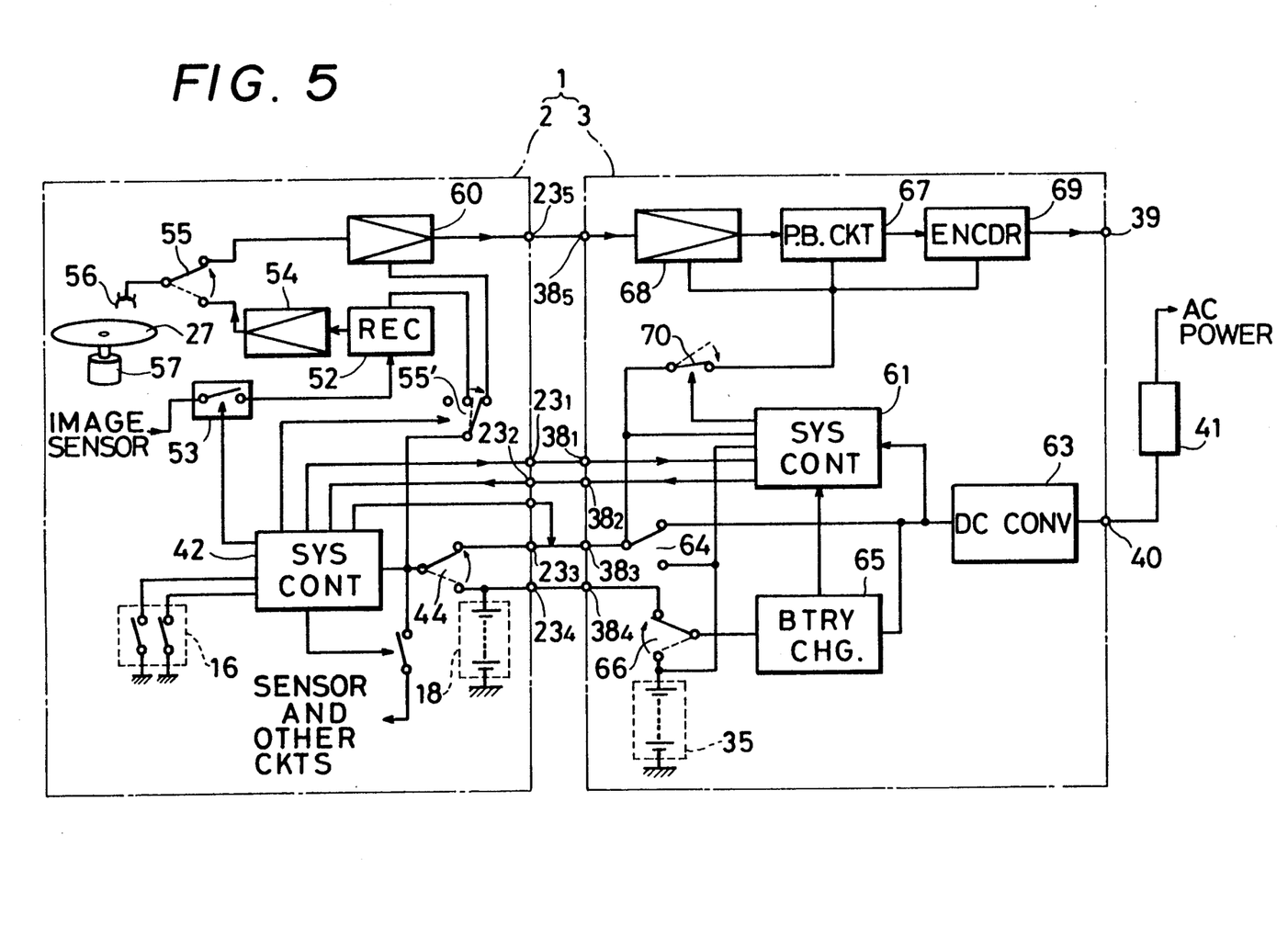
FIG. 5 is a block diagram of a portion of the camera and player circuitry, useful for understanding one aspect of the present invention.

Turning to FIG. 5, in the preferred embodiment herein, when camera 2 is not connected to player 3, the camera is disposed in its image signal recording mode. Thus, switch 44 as well as switch 55 exhibit the states represented by broken lines. That is, read/write head 56 is coupled by switch 55 through recording amplifier 54 to recording circuit 52. When an image signal recording operation is performed, system controller 42 responds to shutter release button 16 to couple image signals produced by the image sensor through gate 53 to the recording circuit. Preferably, shutter release button 16 is provided with two sets of contacts, the first set being completed when the shutter release button is partially depressed and the second set being completed when the shutter release button is fully depressed. System controller 42 is supplied with signals representing which of these sets of contacts is completed.

A switching circuit 55' is coupled to system controller 42 and is controlled thereby in response to the particular set of shutter release contacts which is completed. For example, when the shutter release button is partially depressed, system controller 42 controls switch 55' to the state, or position, represented by broken lines. Hence, when the shutter release button is partially depressed, DC power is supplied from battery 18 through switch 44 and switch 55' to recording circuit 52. Of course, the power supplied from battery 18 also is coupled to other circuits included in the operating components of camera 2 to facilitate an electronic image recording operation. At this time, camera 2 is in its "ready" mode awaiting the generation of image signals by sensor 48.

When shutter release button 16 is fully depressed, system controller 42 responds thereto to open gate 53. Hence, image signals produced by sensor 48 are coupled through the gate to recording circuit 52 and thence through amplifier 54 and switch 55 to read/right head 56. Image signals thus are recorded on disk 27.

To display previously recorded image signals, player 3 is connected to camera 2 and, preferably, a monitor or other television display is connected to output terminal 39. The connection of camera 2 and player 3 is detected by system controller 42. For example, a switch may be closed when plug 38 is inserted into socket 23. This detected connection between the camera and player is communicated from system controller 42 to system controller 61 by way of terminals $23_1$ and $38_1$, as schematically illustrated in FIG. 5. System controller 42 changes over switch 55 in response to the detected connection between the camera and player, thus coupling read/write head 56 to playback amplifier 60. In addition, gate 53 is closed to prevent image signals from being supplied to recording circuit 52.

System controller 42 also changes over switch 55' to supply DC power to playback amplifier 60 and to remove DC power from recording circuit 52.

Still further, the system controller changes over the coupling of power switch 44 from battery 18 to terminal $23_3$ which, as will be described, supplies DC power from player 3 through switch 55' to playback amplifier 60. This DC power from the player also is supplied to system controller 42. That is, DC power produced either by player battery 35 or by converter 63 now is supplied to the operating components of camera 2. Hence, camera 2 is disposed automatically and powered to operate in its image signal playback mode.

Image signals reproduced by read/write head 56 from disk 27 and amplified by playback amplifier 60 are supplied from terminal $23_5$ of camera 2 to terminal $38_5$ of plug 38. These played back image signals thus are coupled to the signal processing circuitry included in player 3. As shown, the reproduced image signals are further amplified by amplifier 68, processed by playback circuit 67 and encoded to viewable picture signals, such as NTSC signals, by encoder 69. These viewable picture signals are supplied to output terminal 39 for display by a monitor or other television display connected thereto. Thus, image signals may be reproduced and displayed immediately upon the connection of the camera and the player without actuating a playback button or switch.

As mentioned above, the connection between camera 2 and player 3 is detected by system controller 42. An indication of this detected connection is supplied from system controller 42 to system controller 61. System controller 61 responds to this detected connection to close a switch 70 (or open a gate) to supply DC operating potential to the player signal processing circuitry. The source of this DC power is selected by selector switch 64. That is, DC operating potential produced either by converter 63 or by player battery 35 is coupled by selector switch 64 to the signal processing circuitry of player 3.

Figure 6A:
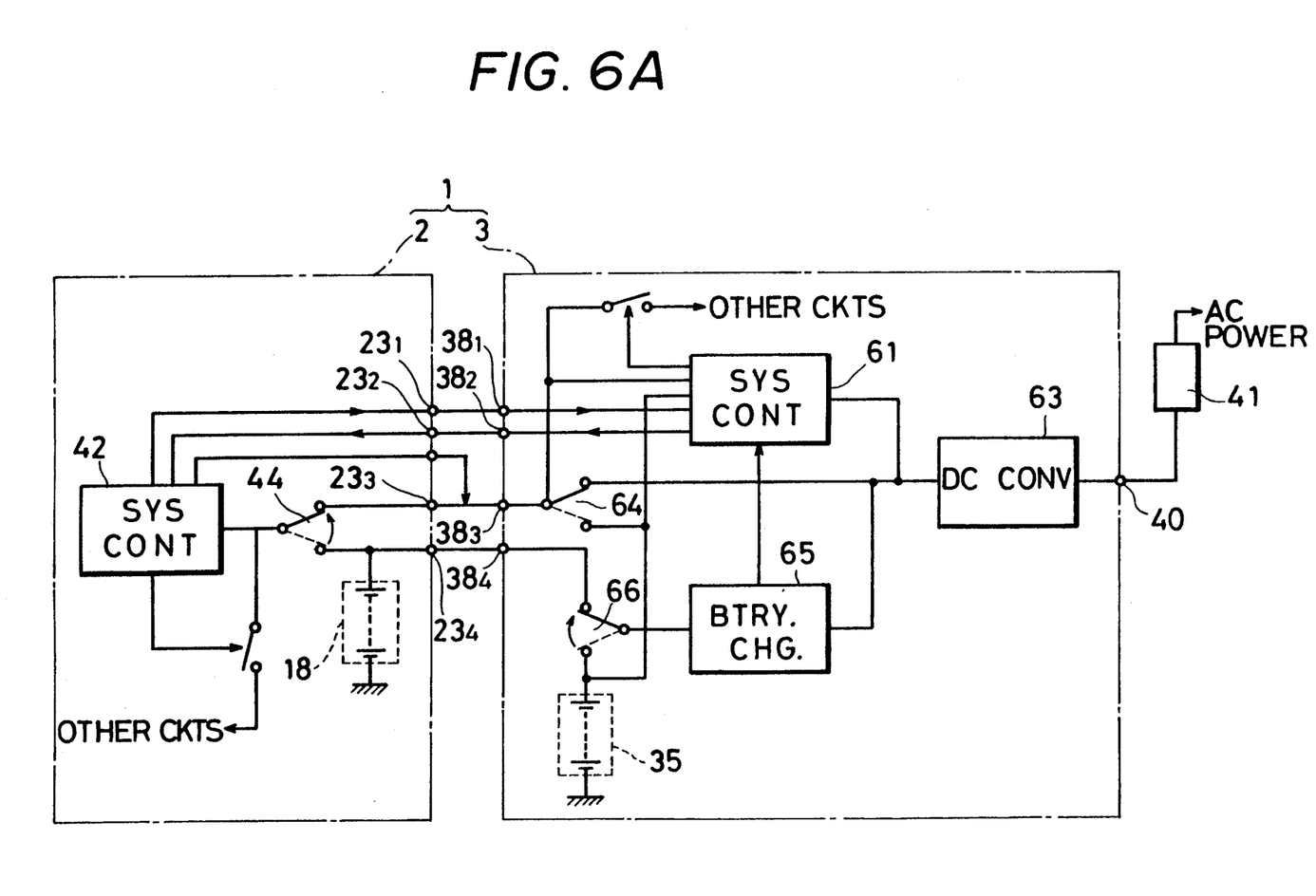
FIG. 6A is a block diagram of a portion of the circuitry included in the camera and player and is useful in understanding another aspect of the present invention.
Figure 6B:
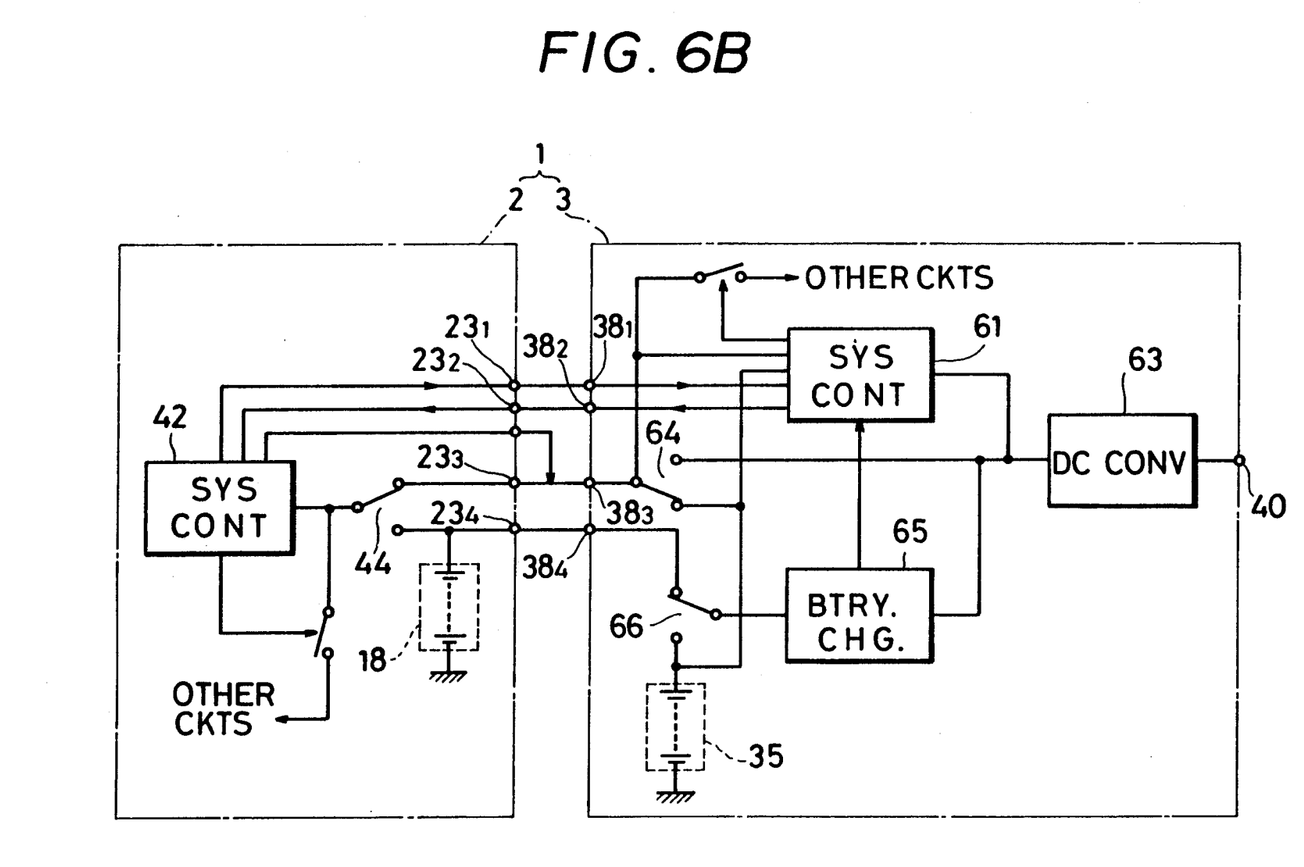
FIG. 6B is a block diagram similar to that of FIG. 6A and is useful in understanding a still further aspect of this invention.

Turning to FIG. 6A, let it be assumed that camera 2 and player 3 are connected and that AC adaptor 41 is coupled to AC mains to supply a voltage to converter 63 via DC input terminal 40. In the preferred embodiment, system controller 61 senses a DC output voltage produced by converter 63 which, it is appreciated, is provided only when AC adaptor 41 is coupled thereto.

As mentioned above, system controller 42 supplies an indication of the camera-player connection to system controller 61. When system controller 61 is provided with such an indication and also with an indication that converter 63 is coupled to an operating AC adaptor, the system controller commands selector switch 64 to change over from its state (or position) represented by the broken line to that represented by the solid line. Hence, DC power is supplied to camera 2 from converter 63. More particularly, the output of converter 63 is coupled to terminal $38_3$ by selector switch 64 and thence to terminal $23_3$ of camera 2. At the same time, system controller 42 responds to the detected connection between camera 2 and player 3 to command power switch 44 to change over from the state, or position, represented by the broken line to that represented by the solid line. Hence, the DC power supplied to the camera from player 3 is supplied to the operating components included in the camera. This DC power also is supplied to system controller 42, as illustrated.

In the event that AC adaptor 41 is not operably coupled to converter 63, for example, if the AC adaptor is not connected to AC mains or if the AC adaptor is not coupled to input terminal 40, converter 63 does not produce a suitable DC output voltage. System controller 61 thus does not sense a proper DC voltage. Accordingly, system controller 61 controls the state, or position, of selector switch 64 to couple battery 35 to terminal $38_3$ and thence to terminal $23_3$ of camera 2.

Thus, it will be seen that, when camera 2 is connected to player 3, the DC power produced either by player battery 35 or by converter 63 is supplied to camera 2 and is substituted for the DC power normally produced by camera battery 18. Therefore, the energy level of camera battery 18 is not depleted when the camera and player are connected and a playback operation is carried out. The playback circuitry included in camera 2 is powered by energy derived from player 3.

As illustrated above in conjunction with FIG. 4 and as repeated in FIG. 6A, the DC voltage produced by converter 63 is supplied to battery charger 65. When player 3 is not connected to camera 2, charging switch 66 connects player battery 35 to the output of battery charger 65. Thus, when converter 63 is supplied with energy from AC adaptor 41, player battery 35 is charged by battery charger 65. However, when a connection between camera 2 and player 3 is detected, system controller 61 changes over the state, or position, of charging switch 66 to connect the output of battery charger 65 to terminal $38_4$ and thence to terminal $23_4$ to charge camera battery 18. Accordingly, when the camera and battery are connected and, moreover, when an operative AC adaptor 41 is coupled to player 3, the following occur:

DC power produced by converter 63 is coupled to camera 2 and is substituted for the DC power normally produced by camera battery 18.

Battery charger 65 is connected by switch 66 to charge camera battery 18. That is, the camera battery is charged preferentially prior to the charging of player battery 35.

Although not shown, when camera battery 18 is charged sufficiently, a suitable charge indicating signal is returned to system controller 61 by system controller 42, whereupon charging twitch 66 is changed over to connect the output of battery charger 65 to player battery 35. Hence, after the camera battery is charged the player battery may be charged.

Let it now be assumed that camera 2 and player 3 are connected, but that AC adaptor 41 is not connected to DC input terminal 40. In that event, power switch 44 of camera 2 remains coupled to receive the DC power supplied to the camera from player 3, as shown in FIG. 6B, but selector switch 64 now couples the DC power produced by player battery 35 to camera 2. Battery charger 65, although inoperative, nevertheless remains connected to camera battery 18 to minimize energy depletion of this battery. But, the DC power produced by player battery 35 now is substituted for the DC power normally supplied to camera 2 by camera battery 18. In the event that camera battery 18 is a primary battery and, thus, is not rechargeable, it is a simple matter simply not to connect AC adaptor 41 to DC input terminal 40. Hence, when the camera and player are connected, there is no attempt to charge camera battery 18 if charger 65 is not operating.

While the present invention has been particularly shown and described with reference to a preferred embodiment, it will be readily appreciated by those of ordinary skill in the art that various changes and modifications may be made without departing from the spirit and scope of the invention. For example, the connection between camera 2 and player 3 has been described as being detected by system controller 42. Alternatively, system controller 61 may detect a connection. As yet a further alternative, the various states, or positions, of switches 44, 64 and 66 may be determined simply by the mechanical connection between the camera and player and not necessarily by the system controllers. For example, when the camera and player are not connected, switch 44 normally is coupled to camera battery 18, switch 64 normally is coupled to player battery 35 and switch 66 normally couples battery charger 65 to player battery 35. When AC adaptor 41 is operatively coupled to DC input terminal 40, switch 64 couples the output of converter 63 to the signal processing circuitry included in player 3, thereby permitting battery charger 65 to recharge player battery 35 while enabling the signal processing circuitry to operate in response to DC power supplied by converter 63. But, when camera 2 is connected to player 3, switch 44 is changed over to substitute the DC power supplied by player 3 for the DC power normally supplied by camera battery 18. Moreover, switch 66 is changed over to supply a battery charging current from battery charger 65 to camera battery 18, thereby preferentially charging the camera battery before the player battery is charged. Depending upon whether AC adaptor 41 is operatively coupled to DC input terminal 40, switch 64 supplies to camera 2 the DC power produced either by converter 63 or by player battery 35.

System controller 42 and/or system controller 61 may include a suitably programmed microprocessor, such as an Intel Model 8088. Those of ordinary skill in the art will readily recognize the manner in which the microprocessor(s) may be programmed to carry out the operations discussed above.

Since the connection of camera 2 and player 3 disposes the camera in a signal playback mode, the DC power supplied to the camera from the player may be utilized merely to operate the signal playback circuitry of the camera. That is, the signal recording circuitry may be disabled while the camera and player are connected.

While the connection between camera 2 and player 3 has been described as being comprised of several conductors included in cable 37, other suitable connections may be provided without a physical cable therebetween. For example, player 3 may include a plug mounted on outer casing 3a and adapted to be directly inserted into socket 23 of camera 2. Therefore, it is intended that the appended claimed be interpreted as including the embodiment discussed above, the aforesaid alternatives and all other equivalents thereto.

What is claimed is:

1. Still image recording/playback apparatus, comprising: an electronic still camera having camera operating components including image sensor means for sensing an image and producing image signals representative thereof, recording means including a recording medium for recording image signals derived from said image sensor means, and reproducing means for reproducing the recorded image signals, said electronic still camera exhibiting operating modes including recording and reproducing modes, and further having camera control means for controlling at least said recording means and said reproducing means; electronic player means exhibiting operating modes including a playback mode for recovering image signals reproduced by the reproducing means and having player operating components including signal processing means for processing the reproduced image signals to produce viewable picture signals and player control means for selectively controlling the operation of said electronic player means; connection means for selectively connecting said electronic player means to said electronic still camera; detecting means for detecting whether said connection means is present between said camera and said player means; and
   means responsive to the detection of said connection means between said camera and player means for causing said camera control means to automatically initiate the reproducing and playback modes of said camera and player means, respectively.

2. The apparatus of claim 1 wherein said detecting means is coupled to said camera control means for supplying a connection detect signal thereto when said connection means between said camera and player means is present, and said camera control means responds to said connection detect signal to initiate operation of said reproducing means and to cause said player control means to establish said playback mode.

3. The apparatus of claim 2 wherein said camera control means is further responsive to said connection detect signal to supply a signal through said connection to said player control means, and said player control means is responsive to said signal to enable operation of said signal processing means.

4. The apparatus of claim 3 wherein at least one of said camera and player control means is a microprocessor.

5. The apparatus of claim 1 further comprising, power supplying means for supplying power to said operating components from selected power sources; and means for initiating a power supplying operation for supplying power from a selected power source.

6. The apparatus of claim 1 wherein said camera includes a camera power source for normally supplying power to at least said camera operating components and said player means includes a player power source for normally supplying power to at least said signal processing means; and further comprising means responsive to the detection of said connection means between said camera and said player means for interrupting the power supplied by said camera power source to said camera operating components and for supplying power to said camera operating components from said player power source.

7. The apparatus of claim 6 wherein said connection means includes conducting means for conducting power from said player power source to said camera, and said camera further includes power switch means normally coupling the power produced by said camera power source to said camera operating components and responsive to the detection of said connection means between said camera and said player means for coupling to said camera operating components the power supplied to said camera by said conducting means from said player power source.

8. The apparatus of claim 7 wherein said camera power source and said player power source each comprises a battery.

9. The apparatus of claim 7 wherein said player power source includes DC converting means for converting an AC supply voltage to DC power, and means for coupling said DC converting means to AC mains.

10. The apparatus of claim 9 wherein said player means further includes selector switch means normally coupling the battery of said player power source to said conducting means to supply to said operating components power produced by said battery of said player power source and operative to couple the DC power produced by said DC converting means to said conducting means when said DC converting means is coupled to said AC mains.

11. Still image recording/playback apparatus, comprising:
   an electronic still camera having camera operating components including image sensor means for sensing an image and producing image signals representative thereof, recording means including a recording medium for recording image signals derived from said image sensor means, and reproducing means for reproducing the recorded image signals, said electronic still camera exhibiting operating modes including recording and reproducing modes, and further having camera control means for controlling at least said recording means and said reproducing means;

electronic player means exhibiting operating modes including a playback mode for recovering image signals reproduced by the reproducing means and having player operating components including signal processing means for processing the reproduced image signals to produce viewable picture signals and player control means for selectively controlling the operation of said electronic player means;

connection means for selectively connecting said electronic player means to said electronic still camera;

a rechargeable battery included in at least one of said camera and said player means;

battery charger means for charging said rechargeable battery included in one of said camera and said player means;

detecting means for detecting whether said connection means is present between said camera and said player means and including means for controlling at least one of said camera and player control means; and means responsive to the detection of said connection means between said camera and player means to automatically establish a battery charging operation in which said rechargeable battery is coupled to said battery charger means.

12. The apparatus of claim 11 wherein said camera includes a rechargeable battery for normally supplying power to at least said camera operating components, said player means includes a rechargeable battery for normally supplying power to at least said signal processing means, and said player means further includes the battery charging means for normally charging the player means battery and responsive to the detection of said connection means between said camera and said player means for charging the camera battery before the player means battery is charged.

13. The apparatus of claim 12 wherein said player means further includes charging switch means for selectively coupling said player means battery to said charging means; and said connection means includes conducting means for connecting the camera battery to said charging switch means, said charging switch means being responsive to the detection of said connection means between said camera and said player means for coupling said camera battery to said charging means.

14. The apparatus of claim 13 wherein said charging means includes DC converting means for converting an AC supply voltage to DC power, means for coupling said DC converting means to AC mains, and means for coupling the converted DC power to said conducting means; and said camera additionally includes power selector means for normally coupling said camera battery to said camera operating components and responsive to the detection of said connection means between said camera and said player means for coupling to said camera operating components the DC power coupled to said conducting means from said DC converting means.

15. The apparatus of claim 13 wherein said conducting means additionally connects said player means battery to said camera; and said camera additionally includes power selector means for normally coupling said camera battery to said camera operating components and responsive to the detection of said connection means between said camera and said player means for coupling to said camera operating components power supplied to said camera from said player means battery.

16. The apparatus of claim 15 wherein said charging means includes DC converting means for converting an AC supply voltage to DC power, means for coupling said DC converting means to AC mains, and selector means for selecting the DC converting means or the player means battery for connection to said conducting means; whereby said DC converting means is connected to said conducting means to supply power to said operating components when said DC converting means is coupled to said AC mains, and said player means battery is connected to said conducting means to supply power to said operating components when said DC converting means is not coupled to said AC mains.

17. Still image recording/playback apparatus, comprising: an electronic still camera having operating components including image recording means for recording image signals and image reproducing means for reproducing the recorded image signals, said electronic still camera further having camera control means for controlling said operating components; and electronic player means for recovering reproduced image signals and connectable to said camera and having signal processing means for processing the image signals reproduced by the camera reproducing means to produce viewable picture signals, and player control means for controlling the operation of said electronic player means; one of said camera and player control means including detecting means for detecting whether or not said camera and said player means are connected together and means responsive to the detection of said camera and said player means being connected together for controlling both of said camera and player control means so as to automatically establish a playback mode of operation, whereby the camera reproducing means reproduces the recorded image signals and the player signal processing means produces viewable picture signals in response to the reproduced image signals.

18. The apparatus of claim 17 wherein the camera control means includes said detecting means, further including means for providing a communication path between both controls means when said camera and player means are connected together, and wherein said camera control means supplies to said player control means a connection detect signal when the camera and player means are connected together, thereby to establish a playback mode for said player means.

19. The apparatus of claim 18 wherein said camera control means establishes a recording mode for said camera when said camera and said player means are not detected as being connected thereto.

20. Still image recording/playback apparatus, comprising: an electronic still camera having operating components to record and reproduced image signals and a rechargeable camera battery for normally supplying power to said operating components; an electronic player connectable via connection means to said camera and having signal processing means for processing reproduced image signals, a rechargeable player battery for normally supplying power to said signal processing means, and battery charging means for normally charging said player battery; detecting means for detecting said connection means between said camera and said player; and means responsive to said detecting means for coupling said charging means to said camera battery via said connection means to charge said camera battery.

21. The apparatus of claim 20 wherein said detecting means is included in said camera.

22. The apparatus of claim 20 wherein said connection means includes conducting means for providing a battery charging connection from said camera to said player; and said player includes charging switch means coupled to said battery charging means for normally connecting said battery charging means to said player battery and responsive to the detection of said connection means for connecting said battery charging means to said conducting means, whereby said camera battery is charged.

23. The apparatus of claim 22 wherein said player further includes DC converting means for converting an AC supply voltage to DC power, said battery charging means being energized by said DC converting means; said connection means includes additional conducting means for providing a DC power connection from said camera to said player to receive the DC power produced by said converting means; and said camera further includes power selector means for normally coupling said camera battery to said operating components and responsive to the detection of said connection means for coupling the DC power received by said additional conducting means to said operating components, thereby enabling said camera battery to be charged while said operating components operate.

24. The apparatus of claim 23 wherein said player additionally includes selector means coupled to said additional conducting means for coupling either said player battery or said converting means to said camera to apply DC power from said player to said camera; and means for detecting a DC output voltage at said converting means for controlling said selector means to couple said converting means to said camera when a DC output voltage is detected and to couple said player battery to said camera when a DC output voltage is not detected.

25. The apparatus of claim 20 wherein said means responsive to said detecting means couples said charging means to said camera battery so as to charge said camera battery before the player battery is charged when said camera is connected to said player.

26. Still image recording/playback apparatus, comprising:

an electronic still camera having camera operating components including image sensor means for sensing an image and producing image signals representative thereof, recording means including a recording medium for recording image signals derived from said image sensor means, and reproducing means for reproducing the recorded image signals, said electronic still camera exhibiting operating modes including recording and reproducing modes, and further having camera control means for controlling at least said recording means and said reproducing means and, in response to a connection detect signal, for initiating operation of said reproducing means and inhibiting operation of said recording means;

electronic player means exhibiting operating modes including a playback mode for recovering image signals reproduced by the reproducing means and having player operating components including signal processing means for processing the reproduced image signals to produce viewable picture signals and player control means for selectively controlling the operation of said electronic player means;

connection means for selectively connecting said electronic player means to said electronic still camera; and detecting means coupled to said camera control means for detecting whether said connection means is present between said camera and said player means and for supplying said connection detect signal to said camera control means when said connection means between said camera and player means is present.

* * * * *